L. P. MOOERS.
PISTON FOR INTERNAL COMBUSTION MOTORS.
APPLICATION FILED JUNE 2, 1917.

1,402,309.

Patented Jan. 3, 1922.

Inventor
Louis P. Mooers,
by Wagner H. Gordon
his attorney

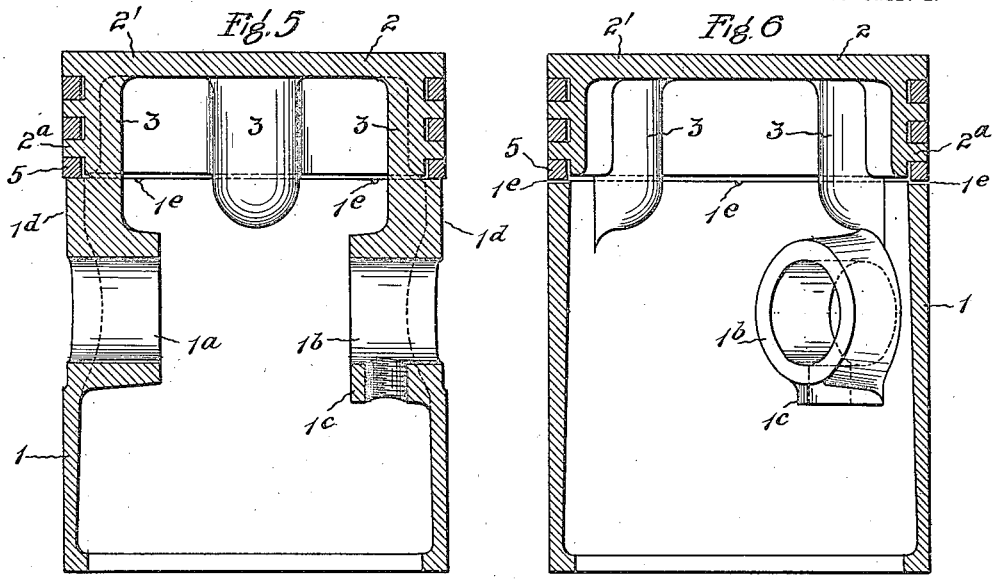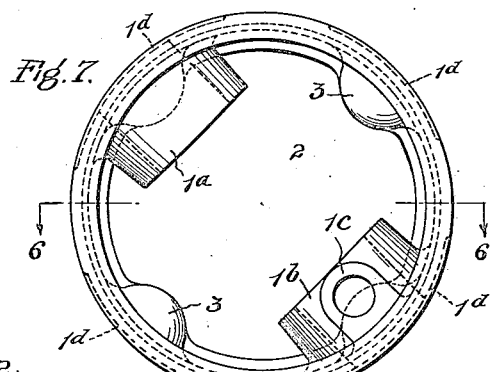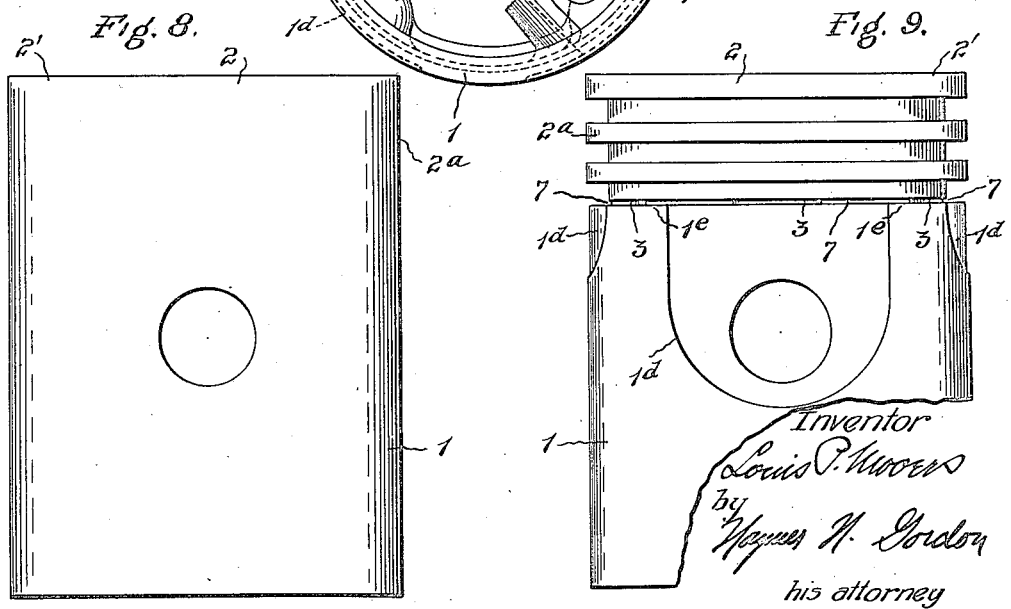

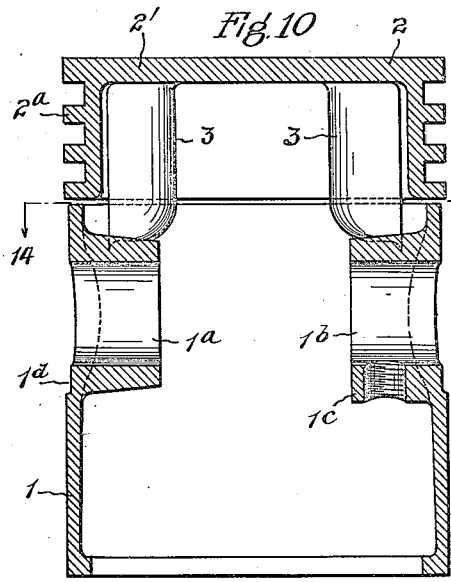
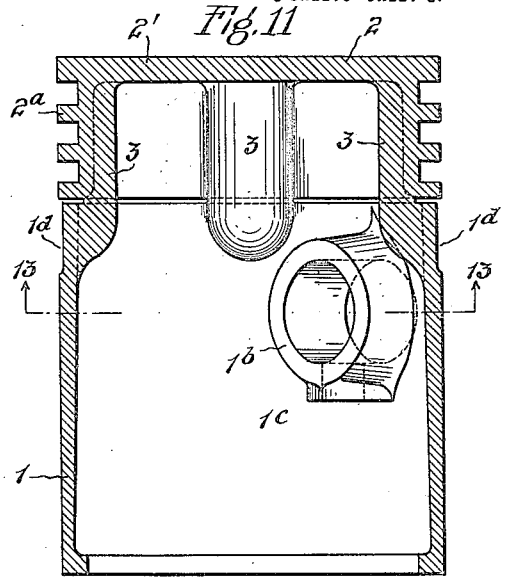
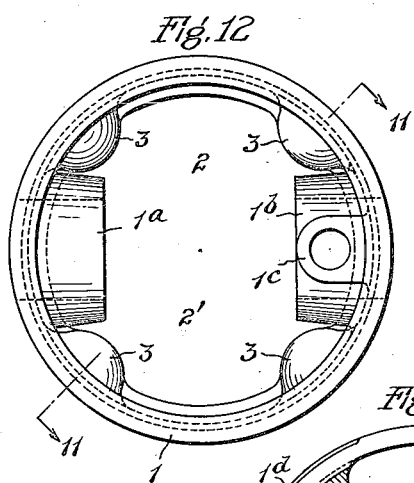
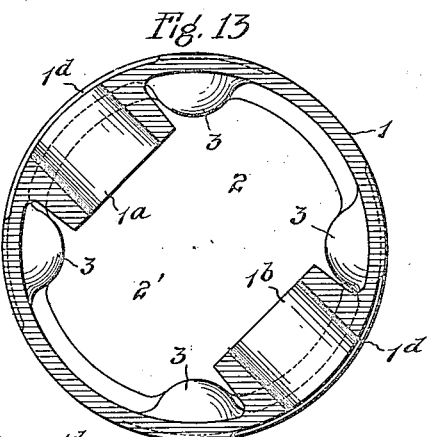
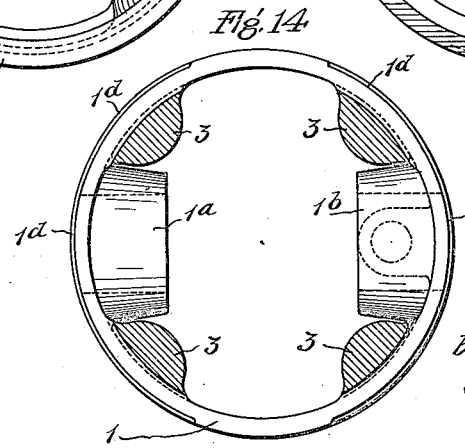

UNITED STATES PATENT OFFICE.

LOUIS P. MOOERS, OF CINCINNATI, OHIO, ASSIGNOR, BY DIRECT AND MESNE ASSIGNMENTS, TO THE CLEVELAND TRUST COMPANY, OF CLEVELAND, OHIO, A CORPORATION OF OHIO.

PISTON FOR INTERNAL-COMBUSTION MOTORS.

1,402,309.  Specification of Letters Patent.  Patented Jan. 3, 1922.

Application filed June 2, 1917. Serial No. 172,380.

*To all whom it may concern:*

Be it known that I, LOUIS P. MOOERS, a citizen of the United States, residing at Cincinnati, in the county of Hamilton and State of Ohio, have invented certain new and useful Improvements in and Relating to Pistons for Internal-Combustion Motors, of which the following is a specification.

The invention relates to improvements in pistons which are adapted especially for use in internal combustion motors.

One of the objects of my invention is to produce a simple, light, durable and efficient skirted piston peculiarly adapted to meet the conditions which exist in an internal combustion motor cylinder, including the stresses and strains imposed upon the piston, principally during the explosion stroke, and by the high heat generated at this time, which heat must be efficiently and economically (*a*) utilized in the translation of heat into mechanical energy, and (*b*) that not translated into mechanical energy properly dissipated.

My present invention comprises improvements on the joint invention of myself and Edward O. Spillman disclosed in Letters Patent of the United States No. 1,092,870.

It contemplates simplifying the construction and manufacture of pistons of this patented type and of considerably lightening the construction as compared with the integral cast structure illustrated in the said patent. It further contemplates the disposition of the parts which go to make up the piston relative to each other so that pistons embodying one form of this invention may be made readily in permanent molds.

It further contemplates the idea of dissipating the heat from the head of the piston more effectively, as concerns the wrist pin bosses, than is the case with the construction illustrated in the said Patent No. 1,092,870.

Other objects of my invention will be obvious to one skilled in the art from the description of one or more embodiments of my idea which I have herein selected to make for the purpose of a comprehensive disclosure of my improvements to one skilled in the art.

In the drawings, Fig. 1 is a longitudinal section of a piston embodying my improvements taken through the axis of the wrist pin bosses.

Fig. 5 is a longitudinal section taken through the axis of the wrist pin bosses of a modified form of piston embodying my invention.

Fig. 6 is a section on the line 6—6, Fig. 7.

Fig. 7 is a bottom plan view of the construction of piston illustrated in Fig. 5.

Fig. 8 is a side elevation of a piston casting after being taken from the mold and before any machining is done on it.

Fig. 9 is a side elevation of said piston casting after it has been externally machined and the cut made to provide the air gap between the head and the skirt section of the piston.

Fig. 10 is a longitudinal section through the axis of the wrist pin bosses of another modified form of my invention.

Fig. 11 is a section on the line 11—11, Fig. 12.

Fig. 12 is a bottom plan view of the piston construction illustrated in Fig. 10.

Fig. 13 is a section on the line 13—13, Fig. 11.

Fig. 14 is a section on the line 14—14, Fig. 10.

Figure 1:
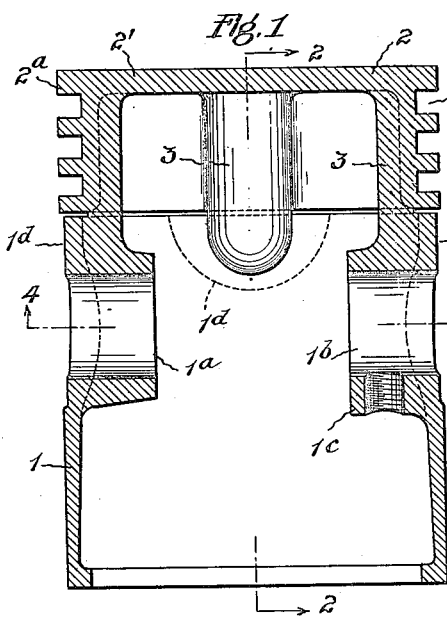

In Figs. 1 to 4 inclusive, 1 is the skirt, body or guide portion of the piston. 2 is the top or piston head. 3 are columns or connectors, preferably integrally formed with the skirt 1 and head 2 for connecting these two parts of the piston together. The head preferably has an end wall 2' and an outer peripheral wall $2^a$, the latter formed preferably with suitable piston ring grooves $2^b$.

Intermediate its ends the guide portion or skirt 1 is preferably formed with inwardly extending, diametrically opposed, aligned, annular wrist pin bosses $1^a$, $1^b$, one of which may have a downwardly or laterally extending lug $1^c$ formed with a screw-threaded hole to receive in the well known manner a suitable locking bolt or screw for the wrist pin (not shown).

The upper end of the guide section or skirt is separated from the head 2 by an air gap. In the drawings, purely for the purpose of illustration, this air gap is shown wider than is necessary. The presence of this air gap or air space between the upper edge of the skirt or body section 1 and the lower edge of the peripheral portion 2ª of the piston head, insures that the heat absorbed by the piston head principally will be transmitted inwardly and downwardly through the columns 3 so that such portion of it as does reach the skirt or body by conduction will do so at points below said air gap and will be reduced in amount so as to reduce relatively the expansion of the skirt as compared with the head, thereby permitting the skirt to be fitted relatively closely to the inner walls of the cylinder. While this air gap, as above indicated has been shown, for the purpose of illustration, wider than necessary, it will be understood that my invention contemplates any sort of a separated relationship between the upper end of the skirt and the adjacent head 2 because of which heat will not be transmitted efficiently or readily from the head to the skirt other than through a connector or connectors which join those two parts of the piston together. It will be understood that this relationship might be that of a poor mechanical fit or joint which would be a poor conductor of heat, as compared with the metal of the head 2 and connectors 3, so that such heat as did pass from the head 2 to the skirt 1 would do so principally by way of the connectors 3, rather than from the head to the upper end of the skirt 1 directly.

A piston of my improved construction may be made unusually light, durable and efficient by forming it of an integral casting of a metallic alloy having a relatively low specific gravity, such for example as an alloy of aluminum, copper and magnesium, or any other metallic alloy of aluminum or other low specific gravity metal known by those skilled in the art to be suitable for the construction of cast, skirted pistons. As the alloys of metals of relatively low specific gravity, suitable for such purposes, have relatively high coefficients of expansion, some difficulty has been experienced with the use of pistons made of them in internal combustion motors, due to the necessary clearance between the piston walls and the cylinder walls to allow for such expansion; as the result of which clearance, both "piston slapping" and "oil pumping" are likely to result, as is well known to those skilled in the art. Furthermore, liquid hydro-carbons are likely to escape past the piston into the crank case and thin down the lubricant below to an undesirable degree.

It will be understood that with a piston constructed in accordance with my invention, the sleeve or skirt 1 may be constructed so as relatively snugly to fit the inner walls of the motor cylinder, whereas the head 2 may be given a considerable amount of clearance between its outer surface and the inner wall of the cylinder to allow for all necessary expansion of the head due to the high temperatures to which it is directly subjected. The fit between the skirt and the inner wall of the cylinder may be a snug sliding fit and the area of the skirt which co-acts with the inner wall of the cylinder be such as to insure against slapping or rapping of the piston against the inner wall of the cylinder. In fact objectionable piston slap, incident to the operation of numerous types of pistons, for use in internal combustion motors, substantially is eliminated, by the use of a piston constructed in accordance with my invention. Likewise oil pumping is substantially eliminated and the passage of liquid hydrocarbons from the top of the piston to the crank case is practically eliminated, resulting in minimizing of undue and troublesome carbonization and undesirable smoking among other things.

Due to the fact that the skirt or sleeve 1 is maintained relatively cool under all normal conditions, the possibilities of scoring of the inner walls of the cylinder are practically eliminated.

The construction of a piston embodying my improvements, as hereinbefore described, may be readily carried out in permanent molds, which is not true of the construction illustrated in said Letters Patent No. 1,092,870, and I have had in mind the use of such permanent molds in the design of my said improvements.

The exterior walls of the skirt near the upper end thereof, where the connectors 3 join the skirt, may be relieved or recessed, as indicated at 1$^d$, to allow for greater expansion at these points than will occur at other points in the same circumference of the skirt.

Figure 2:
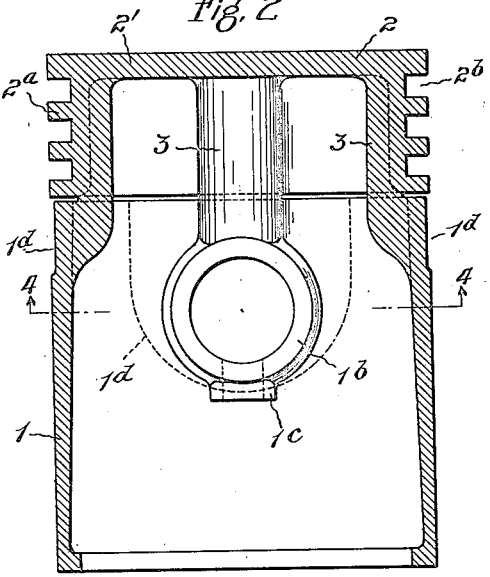
Fig. 2 is a section on the line 2—2, Fig. 1.
Figure 3:
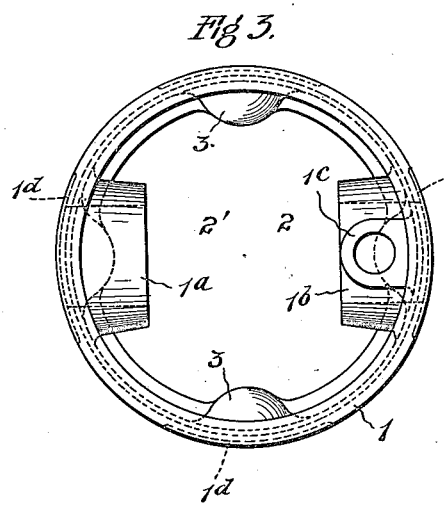
Fig. 3 is a bottom plan view looking into one of my improved pistons.
Figure 4:
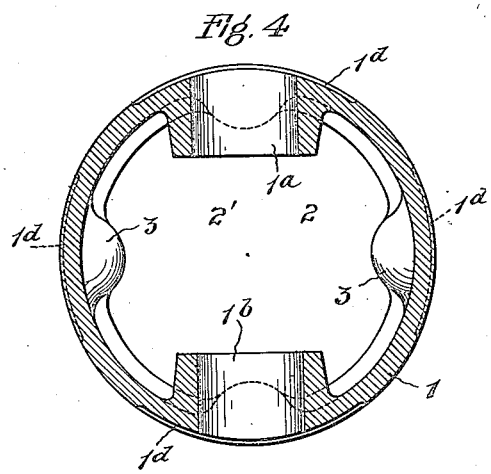
Fig. 4 is a section on the line 4—4, Fig. 1.

In the modification of my invention, illustrated in Figs. 5 to 7, inclusive, the lower piston ring groove is formed by the walls of a recess in the peripheral flange 2ª of the piston head 2 and the upper end wall of the skirt 1. In this case the lower piston ring 5 may be used as and will operate as an oil wiper and will permit the oil to pass underneath it through the grooves 1$^e$ in the upper end wall of the skirt 1 and back into the crank case, thus assisting in keeping the motor from smoking. Where the piston rings are mounted as illustrated in Figs. 1 and 2, the air gap between the upper end of the skirt and the adjacent wall of the peripheral flange of the piston head will serve to provide an escape for oil back to the crank case from the cylinder walls and substantially eliminate undesirable smoking of the motor.

In the modified construction illustrated in Figs. 10 to 14, inclusive, all of the columns or connectors 3 are disposed out of alignment with the wrist pin bosses 1ª. When thus disposed the amount of heat transmitted through such connectors to the wrist pin bosses will be somewhat reduced over that of a piston having the construction illustrated in Figs. 1 to 4, inclusive, as none of such connectors will transmit heat directly to either of the wrist pin bosses, there being a section of skirt between the connection of the lower end of each such connector with the skirt and the connection of the adjacent wrist pin boss with the skirt. Furthermore, with this last referred to modification the relief spaces or recesses in the outer wall of the piston adjacent the points at which the connectors 3 join the skirt will be so disposed as not to reduce any of the principal wearing surfaces of the piston against the inner wall of the cylinder.

In addition, with all the connectors 3 disposed in the regions of the pin bosses, as disclosed in Figs. 10 to 14, inclusive, the piston is especially well adapted to run with a close fit of the guide section 1 in the cylinder. It will be observed, on reference to Figs. 10, 13 and 14, that said guide section has a circumferential zone or belt extending from its upper end down to and below the pin boss openings that is characterized by a short outer diameter in line with the bosses and a long outer diameter at right angles to said bosses, this being due to the above described relief of the piston adjacent the bosses and the connectors 3. Thus when this top zone of the guide heats up the resulting expansion can be accommodated by outward movement of the relieved part of the wall and danger of seizing, as a result of close engagement between the unrelieved part of said wall and the cylinder, is obviated. This action, of course, is made possible by the fact that the upper end of the guide section is not continuously joined to the head section but, being separated from the head by the air gap, is free to take form in a measure independent of the head. The bottom part of the guide section does not attain so high a temperature as said upper zone so that no special provision for the expansion of said lower part is required.

It will be noted that pistons embodying my improvements may be made relatively light in weight, which is of material advantage in assisting in reducing the weight of the reciprocating parts of the motor.

Pistons of my improved construction will be found to operate comparatively noiselessly, smoothly and efficiently within the cylinders of internal combustion motors and with greatly reduced skirt clearances over ordinary constructions of skirted pistons.

In making my improved piston, I prefer to employ the following process. The casting may be formed in any suitable mold as a cup-shaped article, as indicated in Fig. 8. While the invention is not limited to any particular method of casting it is to be observed that the improved construction is especially well adapted for casting in a permanent mold, the form and arrangement of the connectors 3 relative to the inner piston walls and the absence of any obstruction that would prevent free access to said inner walls from the open end of the piston, obviating all difficulties incident to coring. The casting being made, its outer surface may be suitably machined or ground so as to have the general external form illustrated in Fig. 9, or in Figs. 10, 13 and 14, and thereafter the head 2, including end wall 2' and peripheral wall 2ª may be separated from the skirt 1 by inserting a cutting tool at 7, so as to form the air gap between the lower end wall of the peripheral flange 2ª of the head and the upper end wall of the skirt. This separation of the head from the skirt may be effected before externally surfacing the casting, if desired. Any well known type of cutting mechanism may be employed for the purpose. After the cut is made the exterior of the casting will have the general appearance illustrated in Fig. 9.

To those skilled in the art of making mechanism of the class described, many alterations in construction and widely differing embodiments of my application will suggest themselves without departing from the spirit and scope thereof. My disclosures and the description herein are purely illustrative and are not intended to be in any sense limiting.

What I claim is:

1. An integrally cast piston comprising a head section having end and peripheral walls, a guide section separated at its upper edge from the lower edge of the peripheral wall of said head section by an air gap and provided with diametrically opposite wrist pin bosses, and section connectors which spring from the inner surface of the peripheral wall of the head section across said air gap to the upper part of the guide section in the regions of said wrist pin bosses, there being no cored-out space between any of said connectors and the adjacent side walls of the head and guide sections.

2. An integrally cast piston comprising a head section having end and peripheral walls, a guide section separated at its upper edge from the lower end of the peripheral wall of said head section by an air gap and provided with diametrically opposite wrist pin bosses, and section connectors which spring from the inner surface of the peripheral wall of the head section across said air gap to the upper part of the guide section in the regions of said wrist pin bosses, the wall of said guide section being exteriorly relieved opposite said connectors.

3. A piston comprising a head section having end and peripheral walls, a guide section provided with diametrically opposite wrist pin bosses, and means connecting the head and guide sections in the regions of said bosses, the upper edge of the guide section and the lower edge of the head being separated by an air gap in the regions between said connecting means, and the guide section being exteriorly relieved in the regions of the bosses and connecting means.

4. An integrally cast piston comprising a head section having end and peripheral walls, a guide section provided with diametrically opposite wrist pin bosses, and means connecting the head and guide sections in the regions of said bosses, the upper edge of the guide section and the lower edge of the head being separated by an air gap in the regions between said connecting means and the guide section being exteriorly relieved in the regions of the bosses and connecting means.

5. A piston for an internal combustion engine comprising a guide section having a pair of diametrically opposed wrist pin bosses integrally formed therewith, a head having end and peripheral walls the lower edge of the latter being spaced from the upper edge of said guide section by a practically continuous non-conducting air gap, and connectors which extend from said peripheral wall downwardly to said guide section and are integrally formed with said peripheral wall and guide section, said guide section being exteriorly relieved in the regions of said connecting means.

6. An integral cast piston for an internal combustion engine comprising a guide section having a pair of diametrically opposed wrist pin bosses, a head section having end and peripheral walls, the lower edge of the latter being separated from the upper edge of said guide section by a relatively narrow air gap extending practically around the piston, and connectors which spring from said peripheral wall of said head and the upper end of said guide section and bridge said air gap, there being no cored-out space between any of said connectors and the adjacent side walls of the head and guide sections and said guide section being exteriorly relieved in the regions of said connecting means.

7. An integral cast piston for an internal combustion engine comprising a guide section having a pair of diametrically opposed wrist pin bosses, a head section having end and peripheral walls, the lower edge of the latter being separated from the upper edge of said guide section by a relatively narrow air gap extending practically around the piston, and connectors which spring from said peripheral wall of said head and the upper end of said guide section in the regions of said wrist pin bosses and bridge said air gap, said guide section being exteriorly relieved over continuous areas each embracing the region of one of said bosses and the adjacent connecting means.

8. A piston for an internal combustion motor, comprising a guide section having a pair of diametrically opposed wrist pin bosses integrally formed with the guide section, a head having end and peripheral walls, the lower edge of the latter being separated from the upper edge of the guide section by an air gap, and means disposed out of alignment with the axes of said wrist pin bosses and extending across said air gap and providing the sole means of connection between said head and guide section.

9. A piston for an internal combustion motor, comprising a guide section having a pair of diametrically opposed wrist pin bosses integrally formed with the guide section, a head having end and peripheral walls, the lower edge of the latter being separated from the upper edge of the guide section by an air gap, and connectors between the peripheral wall of said head and the guide section formed integral therewith and radially inset with respect to said peripheral wall and providing the sole means of connection between said head and guide section.

10. An integrally cast piston comprising a head section having end and peripheral walls, a guide section separated at its upper edge from the lower edge of the peripheral wall of said head section by an air gap and provided with diametrically opposed wrist pin bosses and section connectors between the head section and the guide section in the regions of said wrist pin bosses, said connectors being disposed radially inside the air gap and there being no cored-out space between any of said connectors and the adjacent side walls of the head and guide sections.

11. An integrally cast piston comprising a head section having an end wall and a peripheral wall formed with a plurality of ring grooves, a guide section provided with diametrically opposite wrist pin bosses, and means connecting the head and guide sections in the regions of said bosses, the upper edge of the guide section and the lower edge of the head being separated in the regions between said connecting means by air gaps disposed below the lower-most of said ring grooves and the guide section being exteriorly relieved in the regions of the bosses and connecting means.

12. An integrally cast piston comprising a head section having end and peripheral walls, a guide section non-compressible circumferentially and provided with diametrically opposite wrist pin bosses, and means connecting the head and guide sections in the regions of said bosses, the upper edge of the guide section and the lower edge of the head being separated by an air gap in the regions between said connecting means and the guide section being exteriorly relieved in the regions of the bosses and connecting means.

In testimony whereof I affix my signature, in the presence of two witnesses.

LOUIS P. MOOERS.

Witnesses:
STANLEY ZULINSKI,
JOHN M. WALTER.